(12) United States Patent
Taha et al.

(10) Patent No.: US 8,594,171 B2
(45) Date of Patent: Nov. 26, 2013

(54) METHOD AND APPARATUS FOR OPERATING A DIVERSITY RECEIVER WITH AN EQUALIZER AND A RAKE RECEIVER

(75) Inventors: Ali Taha, San Diego, CA (US); Chih-Ping Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1017 days.

(21) Appl. No.: 11/954,723

(22) Filed: Dec. 12, 2007

(65) Prior Publication Data

US 2008/0159373 A1      Jul. 3, 2008

Related U.S. Application Data

(60) Provisional application No. 60/870,027, filed on Dec. 14, 2006.

(51) Int. Cl.
  *H03H 7/30*      (2006.01)
  *H03H 7/40*      (2006.01)
  *H03K 5/159*     (2006.01)

(52) U.S. Cl.
  USPC ........... 375/232; 375/230; 375/231; 375/229; 333/18; 333/28 R

(58) Field of Classification Search
  None
  See application file for complete search history.

(56) References Cited

U.S. PATENT DOCUMENTS

| | | | |
|---|---|---|---|
| 6,990,137 B2 * | 1/2006 | Smee et al. | 375/142 |
| 7,082,174 B1 * | 7/2006 | Smee et al. | 375/349 |
| 2003/0026326 A1 * | 2/2003 | Jayaraman et al. | 375/148 |
| 2003/0031234 A1 | 2/2003 | Smee et al. | |
| 2003/0190924 A1 * | 10/2003 | Agashe et al. | 455/522 |
| 2004/0240531 A1 * | 12/2004 | Black et al. | 375/148 |
| 2004/0253955 A1 * | 12/2004 | Love et al. | 455/442 |

(Continued)

FOREIGN PATENT DOCUMENTS

| | | |
|---|---|---|
| EP | 0665658 A2 | 8/1995 |
| EP | 1463215 A2 | 9/2004 |

(Continued)

OTHER PUBLICATIONS

International Search Report and Written Opinion—PCT/US2007/087478, International Search Authority—European Patent Office—Sep. 5, 2008.
Taiwan Search Report—TW096148150—TIPO—Jul. 12, 2011.

*Primary Examiner* — Shuwang Liu
*Assistant Examiner* — Gina McKie
(74) *Attorney, Agent, or Firm* — Eric Ho

(57) ABSTRACT

Techniques for operating a diversity receiver are described. A user equipment (UE) may include (i) a first receive chain having an equalizer and a first rake receiver and (ii) a second receive chain having a second rake receiver. The UE may support (i) a first mode in which only the equalizer is used to process a received transmission and (ii) a second mode in which both rake receivers are used to process the received transmission. The UE may determine a first performance metric for the first mode (e.g., based on the performance of the equalizer) and a second performance metric for the second mode (e.g., based on the performance of both rake receivers or only the first rake receiver). The UE may select the first or second mode based on the performance metrics and may power down the second receive chain if the first mode is selected.

36 Claims, 7 Drawing Sheets

(56) References Cited

U.S. PATENT DOCUMENTS

| | | | |
|---|---|---|---|
| 2005/0197080 A1* | 9/2005 | Ulupinar et al. | 455/135 |
| 2006/0094368 A1 | 5/2006 | Lee et al. | |
| 2007/0014235 A1* | 1/2007 | Stephens | 370/228 |
| 2007/0071070 A1* | 3/2007 | Dominique et al. | 375/147 |
| 2007/0110200 A1 | 5/2007 | Mergen et al. | |
| 2008/0013654 A1* | 1/2008 | Rick et al. | 375/345 |
| 2009/0203339 A1* | 8/2009 | Mergen et al. | 455/226.4 |
| 2009/0268786 A1* | 10/2009 | Matsumoto et al. | 375/148 |

FOREIGN PATENT DOCUMENTS

| | | |
|---|---|---|
| JP | 8237171 A | 9/1996 |
| JP | 9149012 A | 6/1997 |
| JP | 11041157 A | 2/1999 |
| JP | 2005515738 A | 5/2005 |
| JP | 2006121707 A | 5/2006 |
| JP | 2006526966 | 11/2006 |
| WO | WO0105088 A1 | 1/2001 |
| WO | WO01059945 | 8/2001 |
| WO | WO2004109947 | 12/2004 |

\* cited by examiner

METHOD AND APPARATUS FOR OPERATING A DIVERSITY RECEIVER WITH AN EQUALIZER AND A RAKE RECEIVER

The present application claims priority to provisional U.S. Application Ser. No. 60/870,027, entitled "Power Consumption Reduction of UMTS Receive Diversity Chain When Equalizer Is Used," filed Dec. 14, 2006, assigned to the assignee hereof and incorporated herein by reference.

BACKGROUND

I. Field

The present disclosure relates generally to communication, and more specifically to techniques for operating a user equipment (UE) in a wireless communication system.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A UE (e.g., a cellular phone) in a CDMA system may employ a rake receiver to process a received signal. The rake receiver may include a searcher and multiple demodulation elements (or rake fingers). The searcher may search for strong multipaths in the received signal. The rake fingers may be assigned to process strong multipaths found by the searcher. Each rake finger may process its assigned multipath and provide detected symbols for that multipath. The detected symbols from all assigned fingers may then be combined to obtain data symbol estimates. The rake receiver can provide acceptable performance for a CDMA system operating at low geometry, e.g., low signal-to-interference-and-noise ratio (SINR).

An equalizer may also be used to process the received signal. The equalizer may attempt to reduce all noise components such as thermal noise, interference due to other transmissions, and inter-symbol interference (ISI) that can come from multipath and distortion in the wireless channel. At high geometry, ISI may become dominant. The equalizer may be able to more effectively combat ISI than the rake receiver. Hence, the equalizer may be able to provide better performance than the rake receiver at high geometry.

The UE may employ a diversity receiver with multiple receive antennas to obtain diversity against deleterious path effects. At least one propagation path typically exists between a base station antenna and each of the receive antennas at the UE. If the propagation paths for different receive antennas are independent, which is generally true to at least an extent, then diversity increases and the received signal quality improves when multiple antennas are used to receive the signal from the base station.

The UE may have various hardware blocks to process a transmission received via one or more antennas. These hardware blocks consume power when operational. It is desirable to reduce power consumption by these hardware blocks in order to extend battery life for the UE.

SUMMARY

Techniques for operating a diversity receiver by a UE in a manner to achieve good data performance and lower power consumption are described herein. In one design, the UE includes (i) a first receive chain having an equalizer and a first rake receiver and (ii) a second receive chain having a second rake receiver. The UE may support (i) a first mode in which only the equalizer is used to process a received transmission and (ii) a second mode in which the first and second rake receivers are used to process the received transmission.

In one design, the UE may determine a first performance metric for the first mode, e.g., based on the performance of the equalizer. The UE may determine a second performance metric for the second mode, e.g., based on the performance of both rake receivers or only the first rake receiver. The UE may select the first or second mode based on the first and second performance metrics and may power down the second receive chain if the first mode is selected. If the second performance metric is based on both rake receivers, then the UE may periodically power up the second receive chain to determine the second performance metric when the first mode is selected.

The UE may support different and/or additional modes. For example, the UE may support (i) a mode in which only the second rake receiver is used to process the received transmission, (ii) a mode in which the equalizer in the first receive chain and a second equalizer in the second receive chain are used to process the received transmission, and/or (iii) other modes. In general, any number of performance metrics may be determined for any number of supported modes and may be used to select one of the supported modes. Hardware blocks not used for the selected mode may be powered down to save battery power.

Various aspects and features of the disclosure are described in further detail below.

DETAILED DESCRIPTION

Figure 1:
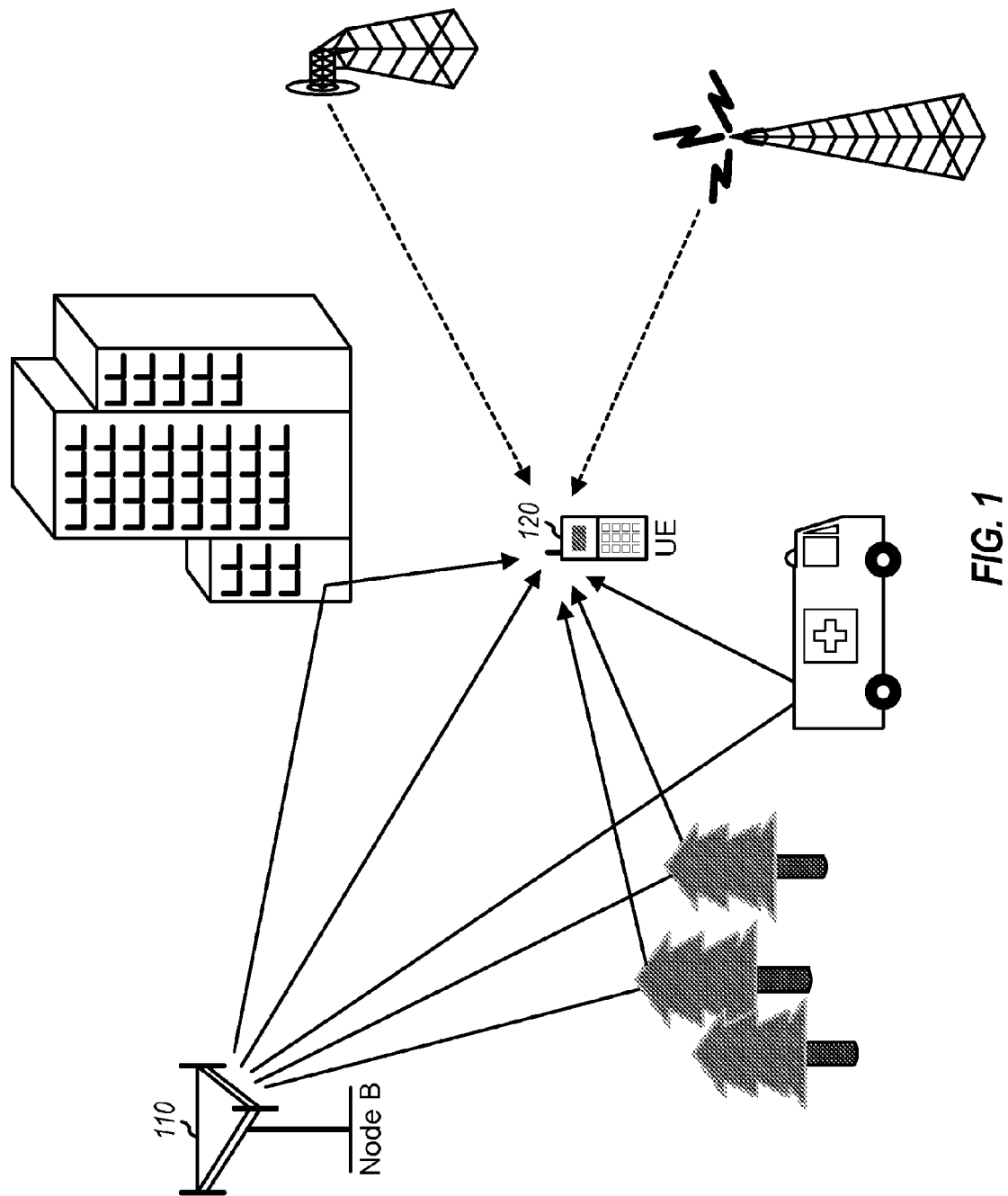
FIG. 1 shows a transmission in a wireless communication system.

FIG. 1 shows an example transmission in a wireless communication system. For simplicity, FIG. 1 shows only one Node B 110 and one UE 120. A Node B is generally a fixed station that communicates with the UEs and may also be referred to as an evolved Node B (eNode B), a base station, an access point, etc. A UE may be stationary or mobile and may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, etc.

Node B 110 may transmit a radio frequency (RF) signal to UE 120. This RF signal may reach UE 120 via one or more signal paths, which may include a direct path and/or reflected paths. The reflected paths are created by reflections of radio waves due to obstructions (e.g., buildings, trees, vehicles, and other structures) in the wireless environment. UE 120 may receive multiple instances or copies of the transmitted RF signal. Each received signal instance is obtained via a different signal path and has a particular complex gain and a particular time delay determined by that signal path. The received RF signal at UE 120 is a superposition of all received signal instances at the UE. UE 120 may also receive interfering transmissions from other transmitting stations. The interfering transmissions are shown by dashed lines in FIG. 1.

The techniques described herein may be used to receive signals from various wireless communication systems such as CDMA, TDMA, FDMA, OFDMA and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (W-CDMA) and other variants of CDMA. cdma2000 covers IS-2000 (commonly known as "1x"), IS-95, and IS-856 (commonly known as "1xEV-DO"). A TDMA system may implement a radio technology such as Global System for Mobile Communications (GSM). An OFDMA system may implement a radio technology such as Evolved UTRA (E-UTRA), Ultra Mobile Broadband (UMB), IEEE 802.16, IEEE 802.20, Flash-OFDM®, etc. These various radio technologies and standards are known in the art. GSM, UTRA and E-UTRA are described in documents from an organization named "3rd Generation Partnership Project" (3GPP). cdma2000 and UMB are described in documents from an organization named "3rd Generation Partnership Project 2" (3GPP2). 3GPP and 3GPP2 documents are publicly available. The techniques may also be used to receive signals from broadcast systems, satellite positioning systems, etc. For clarity, certain aspects of the techniques are described below for Universal Mobile Telecommunication System (UMTS), which utilizes W-CDMA.

Figure 2:
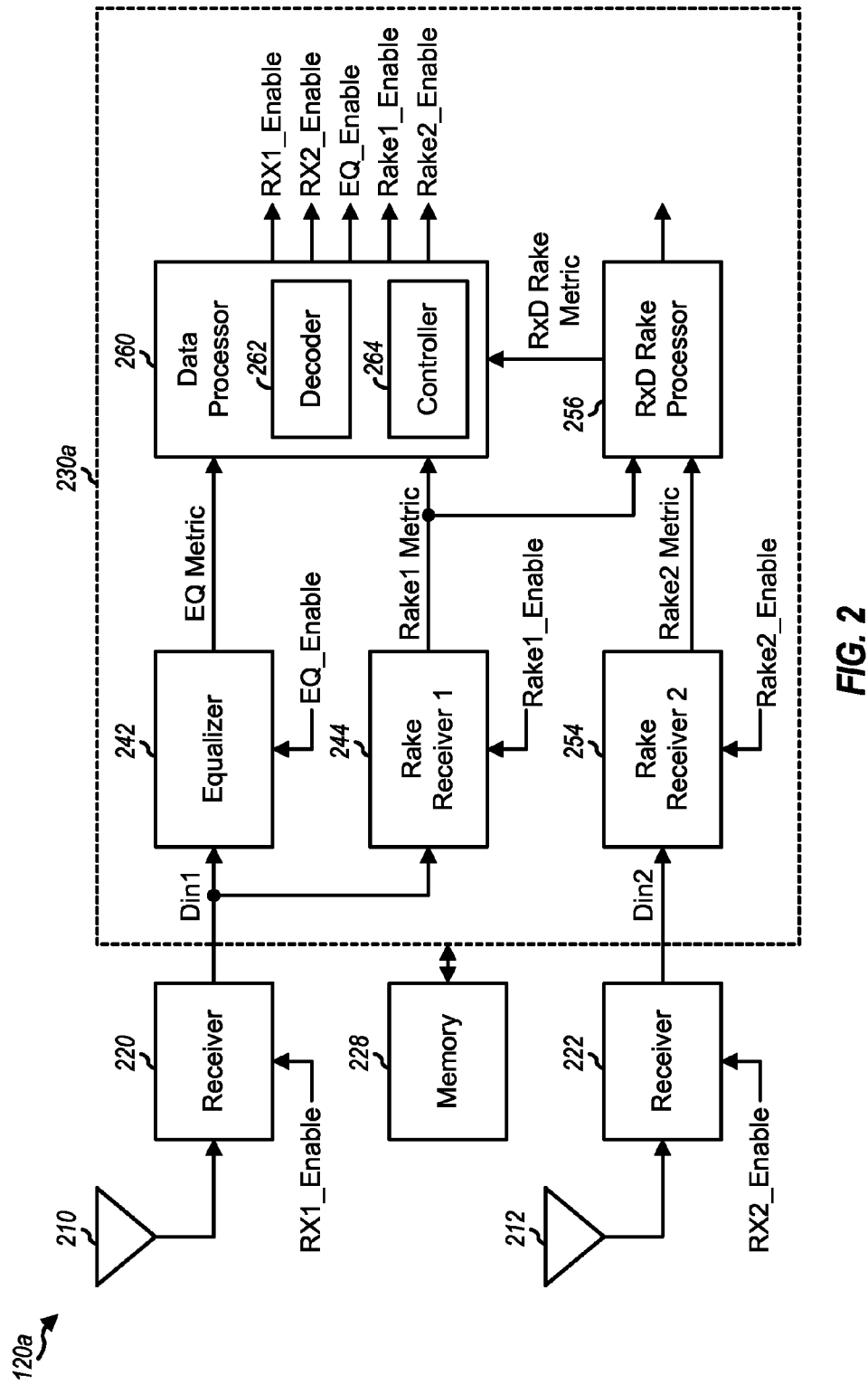
FIG. 2 shows a block diagram of a design of a UE with a diversity receiver.

FIG. 2 shows a block diagram of a UE 120*a*, which is one design of UE 120 in FIG. 1. In this design, UE 120*a* includes two receive antennas 210 and 212 that may be used to obtain receive diversity. Antenna 210 is designated as a primary or main antenna, and antenna 212 is designated as a secondary or diversity antenna. Antennas 210 and 212 may be implemented with the same or different antenna designs. For example, antenna 210 may be an external antenna whereas antenna 212 may be an internal antenna.

A first receive chain (chain 1) includes hardware blocks used to process a primary RF signal from main antenna 210. The first receive chain may also be referred to as a primary receive chain, a main receive chain, etc. In the design shown in FIG. 2, the first receive chain includes a receiver 220, an equalizer 242, and a rake receiver 244. Receiver 220 may process the primary RF signal to obtain input samples, which are denoted as Din1. Receiver 220 may include one or more low noise amplifiers (LNAs), downconverters, filters, amplifiers, analog-to-digital converters (ADCs), etc. Receiver 220 may amplify, filter, frequency downconvert, and digitize the primary RF signal and provide the Din1 samples to equalizer 242 and rake receiver 244 within a digital section 230*a*.

A second receive chain (chain 2) includes hardware blocks used to process a secondary RF signal from diversity antenna 212. The second receive chain may also be referred to as a secondary receive chain, a diversity receive (RxD) chain, etc. In the design shown in FIG. 2, the second receive chain includes a receiver 222 and a rake receiver 254. Receiver 222 may process the secondary RF signal to obtain input samples, which are denoted as Din2. Receiver 222 may include one or more LNAs, downconverters, filters, amplifiers, ADCs, etc. Receiver 222 may amplify, filter, frequency downconvert, and digitize the secondary RF signal and provide the Din2 samples to rake receiver 254 within digital section 230*a*.

In general, each receiver may include any number and any type of circuit block used to condition an RF signal. Receivers 220 and 222 may have the same or different designs. For example, receiver 220 may be designed to meet all applicable receiver requirements even in worst-case conditions. Receiver 222 may be designed to operate with lower current and to meet the receiver requirements under most (but not necessarily worst-case) conditions.

Within digital section 230*a*, the first receive chain includes two demodulation paths. In a first demodulation path, equalizer 242 may process the Din1 samples when enabled by an EQ_Enable signal and may provide data symbol estimates to a decoder 262 within a data processor 260 for further processing. Equalizer 242 may also provide an equalizer (EQ) metric indicative of the performance of equalizer 242 to a controller 264 within data processor 260. In a second demodulation path, rake receiver 244 may process the Din1 samples when enabled by a Rake1_Enable signal and may provide data symbol estimates to decoder 262 for further processing. Rake receiver 244 may also provide a rake receiver (Rake1) metric indicative of the performance of rake receiver 244 to controller 264 and an RxD rake processor 256.

Within digital section 230*a*, the second receive chain includes a single demodulation path. In this demodulation path, rake receiver 254 may process the Din2 samples when enabled by a Rake2_Enable signal and may provide data symbol estimates to decoder 262 for further processing. Rake receiver 254 may also provide a rake receiver (Rake2) metric indicative of the performance of rake receiver 254 to RxD rake processor 256. A memory 228 may store data and program code for the processing units within digital section 230*a*.

In general, various types of performance metrics may be used for the equalizer and rake receivers. In one design, a channel quality indicator (CQI) may be used as the performance metric and may be determined based on pilot and/or some other known transmission. In another design, an energy-per-chip-to-total-received-power ratio (Ec/To) may be used as the performance metric and may be determined based on the received transmission. In yet another design, an energy-per-bit-to-total-noise ratio (Eb/Nt) may be used as the performance metric. Other metrics may also be used to quantify the performance of the equalizer and rake receivers. One or more metrics may be used to determine the geometry of UE 120*a*. Geometry may be related to channel conditions and SINR.

In general, either one or both receive chains may be enabled at any given moment to process a received transmission. For the first receive chain, either equalizer 242 or rake receiver 244 may be selected to process the received transmission.

In a first scheme, UE 120*a* may support the following modes:

Mode 1—only chain 1 is enabled and equalizer 242 is selected, and

Mode 2—both chains 1 and 2 are enabled and both rake receivers 244 and 254 are selected.

UE 120*a* may select one of the two modes in various manners. In one design, a performance metric may be computed for each of the two modes. One mode may then be selected based on the performance metrics for the two modes such that good data performance can be achieved while reducing power consumption whenever possible.

In general, an equalizer may provide better performance than a rake receiver at higher geometries and may have negligible benefits at lower geometries. Conversely, receive diversity with both receive chains enabled may provide significant advantages at lower geometries, but these advantages may start to diminish at higher geometries. Thus, either mode 1 or 2 may be selected based on geometry.

In the design shown in FIG. 2, RxD rake processor 256 may receive the data symbol estimates and the Rake1 metric from rake receiver 244 and the data symbol estimates and the Rake2 metric from rake receiver 254. Processor 256 may determine an RxD Rake metric indicative of the performance of both rake receivers 244 and 254. Controller 264 may receive the EQ metric from equalizer 242 and the RxD Rake metric from processor 256 and may select either mode 1 or 2 based on these metrics. Controller 264 may generate control signals to enable or disable the various hardware blocks in the two receive chains based on the selected mode.

Figure 3:
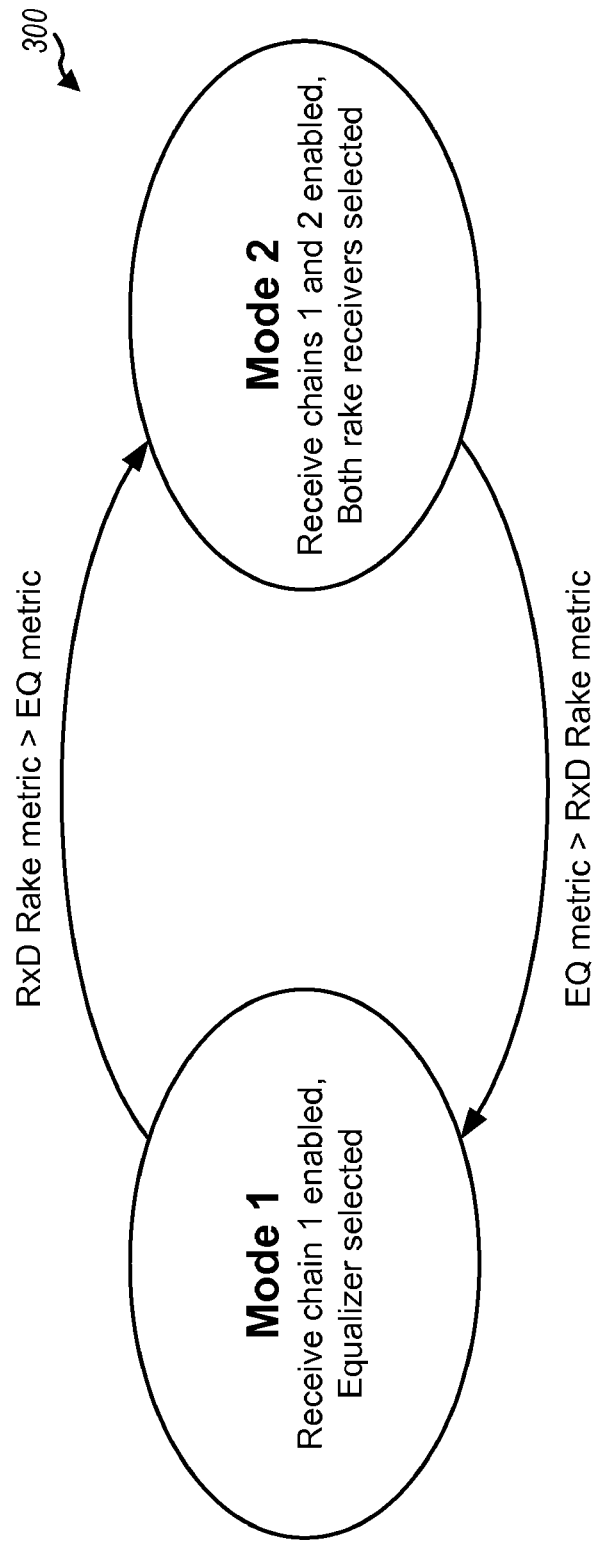
FIG. 3 shows a state diagram for two modes supported by the UE.

FIG. 3 shows a state diagram 300 for the two modes in the first scheme. UE 120a may operate in either mode 1 or 2 at any given moment. When UE 120a operates in mode 1, the first receive chain (e.g., receiver 220 and equalizer 242) may be enabled to process the received transmission. The second receive chain (e.g., receiver 222 and rake receiver 254) as well as rake receiver 244 in the first receive chain may be disabled to save battery power. UE 120a may periodically compute the performance metrics for modes 1 and 2 and may determine whether to remain in mode 1 or transition to mode 2. In the design shown in FIG. 3, if the performance metric for mode 2 (e.g., the RxD Rake metric) is better than the performance metric for mode 1 (e.g., the EQ metric), then UE 120a transitions to mode 2.

When UE 120a operates in mode 2, both receive chains and both rake receivers 244 and 254 may be enabled to process the received transmission. Equalizer 242 in the first receive chain may be disabled to save battery power. UE 120a may periodically compute the performance metrics for modes 1 and 2 and may determine whether to remain in mode 2 or transition back to mode 1. In the design shown in FIG. 3, if the performance metric for mode 1 (e.g., the EQ metric) is better than the performance metric for mode 2 (e.g., the RxD Rake metric), then UE 120a transitions back to mode 1.

While operating in mode 1, the second receive chain may be powered down to conserve battery power. In one design, UE 120a may periodically compute the RxD Rake metric every update interval of T seconds instead of continuously, where T may be any suitable value. UE 120a may power up the second receive chain (and also rake receiver 242 if it is disabled in mode 1) every T seconds in order to compute the RxD Rake metric. UE 120a may then compare the RxD Rake metric against the EQ metric. UE 120a may power down the second receive chain (and possibly rake receiver 242) if the EQ metric is better. UE 120a may transition to mode 2 and leave the second receive chain powered up if the RxD Rake metric is better. The update interval T may be selected based on a trade off between data performance and power saving. T may also be a configurable value and may be selected based on various factors such as preference for data performance versus power saving, the available battery power at UE 120a (e.g., larger T if UE 120a is low on battery power), etc.

In another design, the performance metric for only one rake receiver (e.g., rake receiver 244) is compared against the performance for equalizer 242 to select either mode 1 or 2. UE 120a may select mode 2 and may enable the second receive chain if the performance of equalizer 242 is close to the performance of rake receiver 244. The equalizer performance may be close to the rake receiver performance at lower geometries. Thus, if the EQ metric is close to the Rake1 metric, then this may suggest that UE 120a is observing low geometry. Both rake receivers 244 and 254 may then be selected to obtain receive diversity, which may have better performance at lower geometries. This design may avoid the need to power up the second receive chain periodically in order to compute the RxD Rake metric while operating in mode 1.

In general, if a performance metric indicates high geometry for UE 120a, then equalizer 242 may be selected, and the second receive chain may be powered down. Otherwise, if the performance metric indicates low geometry for UE 120a, then both receive chains may be powered up, and both rake receivers 244 and 254 may be selected. By powering down the second receive chain when equalizer 242 is selected, the power consumption of UE 120a may be significantly reduced.

Referring back to FIG. 2, RxD rake processor 256 may receive and combine the detected symbols from rake receivers 244 and 254 in mode 2 and may provide data symbol estimates. Controller 264 may direct equalizer 242 to provide its data symbol estimates to decoder 262 in mode 1 and may direct processor 256 to provide the data symbol estimates to decoder 262 in mode 2.

In a second scheme, UE 120a may support the following modes:
  Mode 1—only chain 1 is enabled and equalizer 242 is selected,
  Mode 2—both chains 1 and 2 are enabled and both rake receivers 244 and 254 are selected, and
  Mode 3—only chain 1 is enabled and only rake receiver 244 is selected.

For the second scheme, UE 120a may periodically determine one or more performance metrics for one or more of the three supported modes. UE 120a may then select one mode based on the computed performance metric(s) such that good data performance can be achieved while reducing power consumption whenever possible. UE 120a may select one of the three modes based on geometry observed by the UE, which may be estimated based on the computed performance metric(s). In one design, mode 1 may be selected for high geometry, mode 2 may be selected for low geometry, and mode 3 may be selected for moderate geometry.

In one design, UE 120a may periodically compute the EQ metric, the Rake1 metric, and the RxD Rake metric. UE 120a may power up the second receive chain to compute the RxD Rake metric if UE 120a is operating in mode 1 or 3, which uses only the first receive chain. UE 120a may then select one of the three modes based on the performance metrics for these modes. UE 120a may power down the second receive chain if the EQ metric or the Rake1 metric is better than the RxD Rake metric. UE 120a may switch to mode 2 and keep the second receive chain powered up if the RxD Rake metric is better. UE 120a may select between equalizer 242 and rake receiver 244 based on the EQ metric and the Rake1 metric.

In another design, UE 120a may periodically compute the EQ metric and the Rake1 metric (but not the RxD Rake metric) when operating in mode 1 or 3. UE 120a may then select mode 1 if the EQ metric is better than the Rake1 metric and may select mode 2 or 3 if the Rake1 metric is close to the EQ metric. UE 120a may select mode 3 and only enable rake receiver 244 if the Rake1 metric is sufficiently good, e.g., better than a predetermined threshold. UE 120a may select mode 2 and enable both rake receivers 244 and 254 if the Rake1 metric is worse than the threshold. UE 120a may power down the second receive chain if mode 1 or 3 is selected.

UE 120a may also support other modes, e.g., a mode in which only the second receive chain is enabled and only rake receiver 254 is selected. UE 120a may also support other combinations of modes, e.g., only modes 1 and 3. In any case, one of the supported modes may be selected based on one or more performance metrics computed for one or more of the supported modes.

Figure 4:
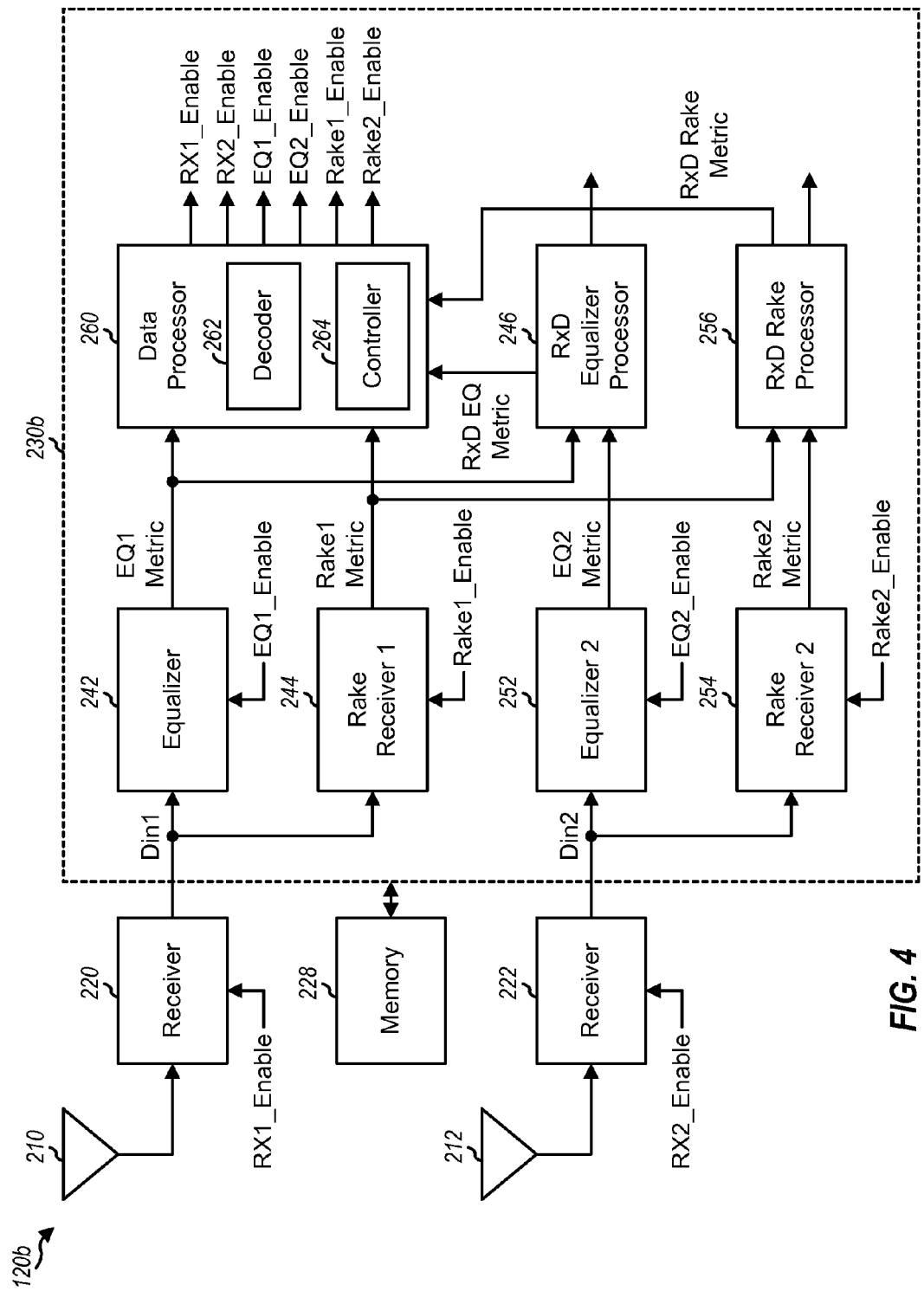
FIG. 4 shows a block diagram of another design of the UE.

FIG. 4 shows a block diagram of a UE 120b, which is another design of UE 120 in FIG. 1. In this design, UE 120b includes two receive antennas 210 and 212 and two receive chains. The first receive chain includes receiver 220, equalizer 242 and rake receiver 244. The second receive chain includes receiver 222, an equalizer 252, and rake receiver 254.

Within a digital section 230b, for the first receive chain, equalizer 242 may process the Din1 samples from receiver 220 when enabled by an EQ1_Enable signal and may provide data symbol estimates and an EQ 1 metric indicative of the performance of equalizer 242. Rake receiver 244 may process the Din1 samples when enabled by a Rake1_Enable signal and may provide data symbol estimates and a Rake1 metric indicative of the performance of rake receiver 244. For the second receive chain, equalizer 252 may process the Din2 samples from receiver 222 when enabled by an EQ2_Enable signal and may provide data symbol estimates and an EQ2 metric indicative of the performance of equalizer 252. Rake receiver 254 may process the Din2 samples when enabled by a Rake2_Enable signal and may provide data symbol estimates and a Rake2 metric indicative of the performance of rake receiver 254.

RxD rake processor 256 may receive the data symbol estimates and the Rake1 metric from rake receiver 244 and the data symbol estimates and the Rake2 metric from rake receiver 254. Processor 256 may determine final data symbol estimates for the two rake receivers and may also determine an RxD Rake metric indicative of the performance of both rake receivers. An RxD equalizer processor 246 may receive the data symbol estimates and the EQ1 metric from equalizer 242 and the data symbol estimates and the EQ2 metric from equalizer 252. Processor 246 may determine final data symbol estimates for the two equalizers and may also determine an RxD EQ metric indicative of the performance of both equalizers.

Controller 264 may receive the EQ1 metric from equalizer 242, the Rake1 metric from rake receiver 244, the EQ2 metric from equalizer 252, the Rake2 metric from rake receiver 254, the RxD Rake metric from processor 256, the RxD EQ metric from processor 246, or any combination of these metrics. Controller 264 may select one of the supported modes based on these metrics. Controller 264 may generate control signals to enable or disable various hardware blocks in the two receive chains based on the selected mode.

UE 120b may support any combination of the following modes:
- Mode 1—only chain 1 is enabled and only equalizer 242 is selected,
- Mode 2—only chain 1 is enabled and only rake receiver 244 is selected,
- Mode 3—only chain 2 is enabled and only equalizer 252 is selected,
- Mode 4—only chain 2 is enabled and only rake receiver 254 is selected,
- Mode 5—both chains 1 and 2 are enabled and both equalizers 242 and 252 are selected, and
- Mode 6—both chains 1 and 2 are enabled and both rake receivers 244 and 254 are selected.

UE 120b may periodically determine one or more performance metrics for one or more of the supported modes. UE 120b may power up a receive channel that is not enabled in order to compute the performance metric(s) for that receive chain and may thereafter power down the receive chain if not needed. UE 120b may select one of the supported modes based on the computed performance metric(s) such that good data performance can be achieved while reducing power consumption whenever possible. UE 120b may utilize any algorithm for mode selection. For example, UE 120b may compare the performance metrics for different modes against each other and may select the mode with the best performance metric. UE 120b may also compare the performance metrics for different modes against one or more thresholds and may select one mode based on the comparison result. In general, UE 120b may select a mode based on any set of criteria and algorithm.

There may be cases in which UE 120b may achieve marginal performance gain by utilizing both equalizers or both rake receivers in the two receive chains. An example of such a case may be an outdoor scenario where UE 120b is not at the coverage edge of a cell. A significant amount of power may be saved by using a single equalizer or a single rake receiver in one receive chain in such a case.

In general, a decision to power up or down a receive chain may be dependent on various factors such as data performance, power consumption by each receive chain, etc. For example, the second receive chain may consume approximately 50 mA of current whereas the equalizer in the first receive chain may consume less than 10 mA of current. In this case, it may be desirable to power down the second receive chain as much as possible, especially when performance gain may be marginal, in order to conserve battery power.

Figure 5:
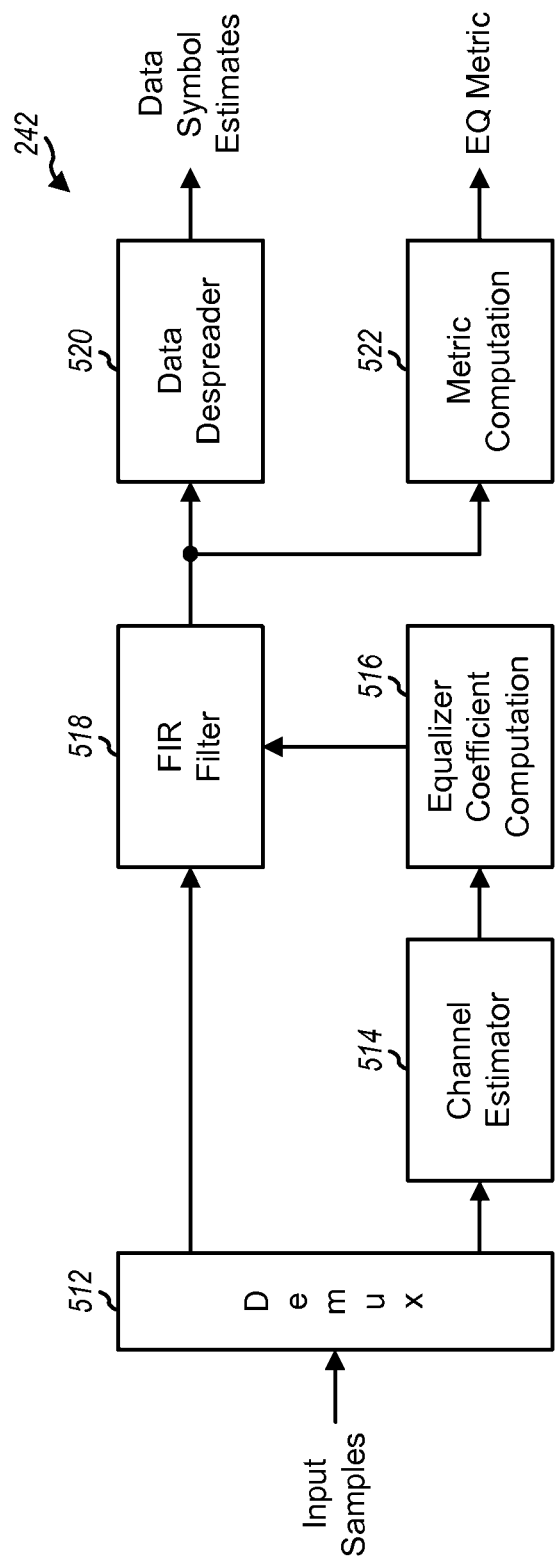
FIG. 5 shows a block diagram of an equalizer.

FIG. 5 shows a block diagram of a design of equalizer 242 in FIGS. 2 and 4, which may also be used for equalizer 252 in FIG. 4. Within equalizer 242, a demultiplexer (Demux) 512 may provide input samples for pilot to a channel estimator 514 and input samples for data to a finite impulse response (FIR) filter 518. Channel estimator 514 may derive a channel estimate based on the input samples. A computation unit 516 may compute equalizer coefficients for FIR filter 518 based on the channel estimate. The equalizer coefficients may be computed as described in commonly assigned U.S. patent application Ser. No. 11/399,891, entitled "EQUALIZER FOR A RECEIVER IN A WIRELESS COMMUNICATION SYSTEM," filed Apr. 7, 2006. FIR filter 518 may filter the input samples with the equalizer coefficients and provide equalized samples. A despreader 520 may despread the equalized samples with a channelization code used for the received transmission and provide data symbol estimates. A computation unit 522 may compute the EQ metric based on the equalized samples (as shown in FIG. 5) or the data symbol estimates (not shown in FIG. 5).

Figure 6:
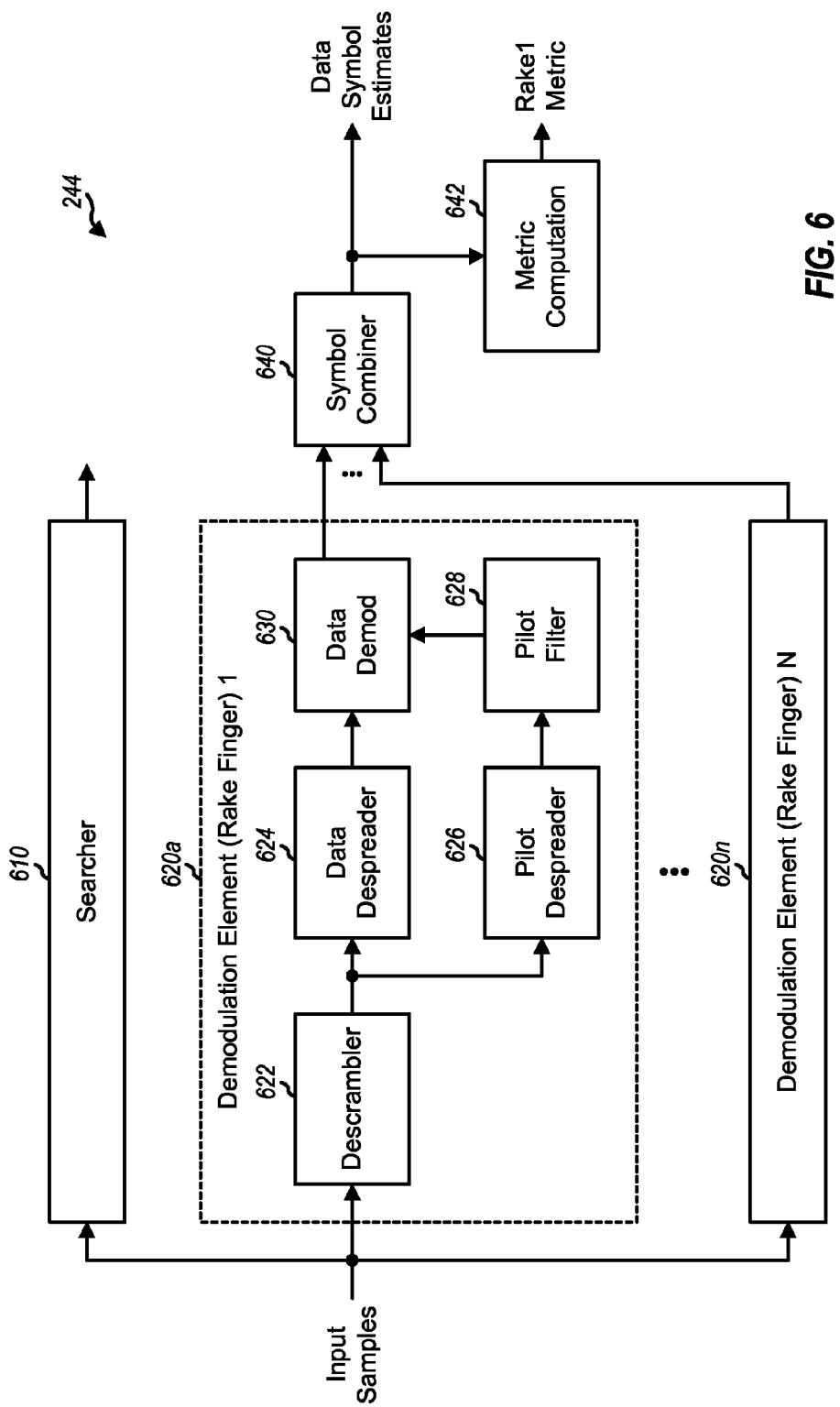
FIG. 6 shows a block diagram of a rake receiver.

FIG. 6 shows a block diagram of a design of rake receiver 244 in FIGS. 2 and 4, which may also be used for rake receiver 254 in FIGS. 2 and 4. In this design, rake receiver 244 includes a searcher 610 and N demodulation elements (or rake fingers) 620a through 620n, where N may be any integer value one or greater. Searcher 610 may search for strong multipaths in the received signal based on pilots transmitted by Node Bs and may provide the strength and timing of each multipath that meets one or more criteria. One rake finger 620 may be assigned to process each multipath of interest, e.g., of sufficient signal strength.

Within rake finger 620a, a descrambler 622 may descramble the input samples with a scrambling sequence and provide descrambled samples. A data despreader 624 may despread the descrambled samples with a channelization code used for the received transmission and provide despread data symbols. A pilot despreader 626 may despread the descrambled samples with a channelization code used for pilot and provide despread pilot symbols. A filter 628 may filter the despread pilot symbols and provide pilot estimates. A data demodulator (Demod) 630 may perform coherent demodulation of the despread data symbols with the pilot estimates and provide detected symbols for the multipath assigned to rake finger 620a. Each remaining rake finger 620 may similarly process the input samples for its assigned multipath.

A symbol combiner 640 may receive and combine the detected symbols from all assigned rake fingers. Combiner 640 may time-align the detected symbols from different rake fingers, combine the time-aligned symbols, and provide data symbol estimates. A computation unit 642 may compute the Rake1 metric based on the data symbol estimates.

Figure 7:
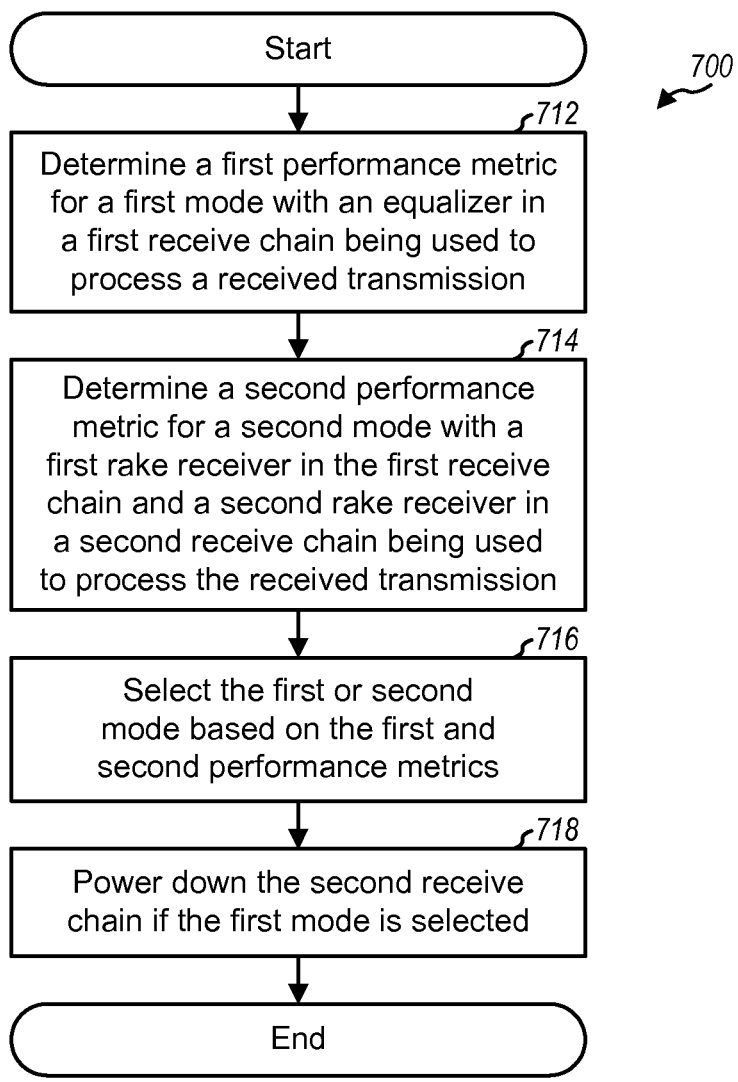
FIG. 7 shows a process for operating the diversity receiver by the UE.

FIG. 7 shows a design of a process 700 for operating the diversity receiver at the UE. A first performance metric may be determined for a first mode with an equalizer in a first receive chain being used to process a received transmission (block 712). A second performance metric may be determined for a second mode with a first rake receiver in the first receive chain and a second rake receiver in a second receive chain being used to process the received transmission (block 714). The first and second performance metrics may comprise CQIs, Ec/Ios, Eb/Nts, and/or other types of metric. The first or second mode may be selected based on the first and second performance metrics (block 716). The second receive chain may be powered down if the first mode is selected (block 718).

The first performance metric may be determined based on the performance of the equalizer and may correspond to the EQ metric. In one design, the second performance metric may be determined based on the performance of the first and second rake receivers and may correspond to the R×D Rake metric. In this design, the second receive chain may be periodically powered up in each update interval to determine the second performance metric when the first mode is selected. In another design, the second performance metric may be determined based on the performance of only the first rake receiver if the first mode is selected and may correspond to the Rake1 metric. For this design, if the second mode is selected, then the second performance metric may be determined based on the performance of only the first rake receiver or both rake receivers.

In one design, the first performance metric may be compared against the second performance metric. The first mode may be selected if the first performance metric is better than the second performance metric. The second mode may be selected if the second performance metric is better than the first performance metric. In another design, the first and second performance metrics may be compared against at least one threshold. The first or second mode may then be selected based on the result of the comparison.

In one design, the equalizer and the first rake receiver may both be powered up if the first or second mode is selected. In another design, only the equalizer may be powered up if the first mode is selected. In one design, the second rake receiver may be powered up only if the second mode is selected. The equalizer and the rake receivers may also be powered up in other manners.

In one design, the UE may support a third mode with only the second rake receiver in the second receive chain being used to process the received transmission. In another design, the UE may support a third mode with the equalizer in the first receive chain and a second equalizer in the second receive chain being used to process the received transmission. For both designs, a third performance metric may be determined for the third mode. The first, second or third mode may then be selected based on the first, second and third performance metrics. The UE may also support different and/or additional modes.

The techniques described herein may be implemented by various means. For example, these techniques may be implemented in hardware, firmware, software, or a combination thereof. For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with code (e.g., procedures, functions, modules, instructions, etc.) that performs the functions described herein. In general, any computer/processor-readable medium tangibly embodying firmware and/or software code may be used in implementing the techniques described herein. For example, the firmware and/or software code may be stored in a memory (e.g., memory 228 in FIG. 2) and executed by a processor (e.g., processor 260). The memory may be implemented within the processor or external to the processor. The firmware and/or software code may also be stored in a computer/processor-readable medium such as random access memory (RAM), read-only memory (ROM), non-volatile random access memory (NVRAM), programmable read-only memory (PROM), electrically erasable PROM (EEPROM), FLASH memory, floppy disk, compact disc (CD), digital versatile disc (DVD), magnetic or optical data storage device, etc. The code may be executable by one or more computers/processors and may cause the computer/processor(s) to perform certain aspects of the functionality described herein.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus configured to operate in a first mode and a second mode, the apparatus comprising:
    a first receive chain having a first demodulation path comprising an equalizer and a second demodulation path comprising a first rake receiver;
    a second receive chain having a third demodulation path comprising a second rake receiver;
    at least one processor configured to determine a first performance metric from the first demodulation path for the first mode, to determine a second performance metric from the second and third demodulation paths for the second mode, and to select the first or second mode based on the first and second performance metrics, wherein, when operating in the first mode, the apparatus uses the equalizer in the first demodulation path in the first receive chain to process a received transmission, and wherein, when operating in the second mode, the apparatus uses the first rake receiver in the second demodulation path in the first receive chain and the second rake receiver in the third demodulation path in the second receive chain to process the received transmission; and a memory coupled to the at least one processor, wherein the at least one processor is configured to power up the first receive chain if the first mode is selected, power up the first receive chain and the second receive chain if the second mode is selected, and power down the second receive chain if the first mode is selected.

2. The apparatus of claim 1, wherein the at least one processor is configured to determine the first performance metric based on performance of the equalizer in the first demodulation path, and to determine the second performance metric based on performance of the first rake receiver in the second demodulation path and the second rake receiver in the third demodulation path.

3. The apparatus of claim 2, wherein the at least one processor is configured to determine the first and second performance metrics in an update interval, and to periodically power up the second receive chain in the update interval to determine the second performance metric when the first mode is selected.

4. The apparatus of claim 1, wherein the at least one processor is configured to determine the first performance metric based on performance of the equalizer, and to determine the second performance metric based on performance of only the first rake receiver.

5. The apparatus of claim 1, wherein the at least one processor is configured to determine the second performance metric based on performance of both the first and second rake receivers.

6. The apparatus of claim 1, wherein the at least one processor is configured to compare the first performance metric against the second performance metric, to select the first mode if the first performance metric is better than the second performance metric, and to select the second mode if the second performance metric is better than the first performance metric.

7. The apparatus of claim 1, wherein the at least one processor is configured to compare the first and second performance metrics against at least one threshold, and to select the first or second mode based on a result of the comparison.

8. The apparatus of claim 1, wherein the apparatus is further configured to operate in a third mode, wherein the at least one processor is configured to determine a third performance metric for the third mode and to select the first, second or third mode based on the first, second and third performance metrics, and wherein, when operating in the third mode, the apparatus uses the first rake receiver in the first receive chain to process the received transmission, and wherein the at least one processor is configured to power down the second receive chain if the third mode is selected.

9. The apparatus of claim 1, wherein the equalizer in the first receive chain is a first equalizer, wherein the second receive chain further comprises a second equalizer, wherein the apparatus is further configured to operate in a third mode, wherein the at least one processor is configured to determine a third performance metric for the third mode, and to select the first, second or third mode based on the first, second and third performance metrics, and wherein, when operating in the third mode, the apparatus uses the first equalizer in the first receive chain and the second equalizer in the second receive chain to process the received transmission.

10. The apparatus of claim 1, wherein the first and second performance metrics comprise at least one of channel quality indicators (CQIs), energy-per-chip-to-total-received-power ratios (Ec/Io), and energy-per-bit-to-total-noise ratios (Eb/Nt).

11. The apparatus of claim 1, wherein the first receive chain is configured to process a first signal from a first antenna, and the second receive chain is configured to process a second signal from a second antenna, wherein the first antenna is associated with both the equalizer and the first rake receiver and the second antenna is associated with the second rake receiver.

12. The apparatus of claim 1, wherein the first and second performance metrics each comprise ratios.

13. The apparatus of claim 12, wherein the ratios comprise one of:
energy-per-chip-to-total-received-power ratios (Ec/Io), and
energy-per-bit-to-total-noise ratios (Eb/Nt).

14. A method comprising:
determining from a first demodulation path a first performance metric for a first mode of operation for a device, wherein, when the device operates in the first mode, the device uses the first demodulation path having an equalizer in a first receive chain to process a received transmission;

determining from second and third demodulation paths a second performance metric for a second mode of operation for the device, wherein, when the device operates in the second mode, the device uses the second demodulation path having a first rake receiver in the first receive chain and the third demodulation path having a second rake receiver in a second receive chain to process the received transmission;

selecting the first or second mode based on the first and second performance metrics;

powering up the first receive chain if the first mode is selected;

powering up the first receive chain and the second receive chain if the second mode is selected; and powering down the second receive chain if the first mode is selected.

15. The method of claim 14, wherein the operation of determining the first performance metric comprises determining the first performance metric based on performance of the equalizer in the first demodulation path, and wherein the operation of determining the second performance metric comprises determining the second performance metric based on performance of the first rake receiver in the second demodulation path and the second rake receiver in the third demodulation path.

16. The method of claim 15, further comprising:
periodically powering up the second receive chain to determine the second performance metric when the first mode is selected.

17. The method of claim 14, wherein the operation of determining the first performance metric comprises determining the first performance metric based on performance of the equalizer, and wherein the determining the second performance metric comprises determining the second performance metric based on performance of only the first rake receiver.

18. The method of claim 14, wherein the operation of selecting the first or second mode comprises:

comparing the first performance metric against the second performance metric, selecting the first mode if the first performance metric is better than the second performance metric, and selecting the second mode if the second performance metric is better than the first performance metric.

19. The method of claim 14, wherein the first receive chain is configured to process a first signal from a first antenna, and the second receive chain is configured to process a second signal from a second antenna, wherein the first antenna is associated with both the equalizer and the first rake receiver and the second antenna is associated with the second rake receiver.

20. The method of claim 14, wherein the first and second performance metrics each comprise ratios.

21. The method of claim 20, wherein the ratios comprise one of:
energy-per-chip-to-total-received-power ratios (Ec/Io), and
energy-per-bit-to-total-noise ratios (Eb/Nt).

22. An apparatus comprising:
means for determining from a first demodulation path a first performance metric for a first mode of operation for the apparatus, wherein, when the apparatus operates in the first mode, the apparatus uses the first demodulation path having an equalizer in a first receive chain to process a received transmission;
means for determining from second and third demodulation paths a second performance metric for a second mode of operation for the apparatus, wherein, when the apparatus operates in the second mode, the apparatus uses the second demodulation path having a first rake receiver in the first receive chain and the third demodulation path having a second rake receiver in a second receive chain to process the received transmission;
means for selecting the first or second mode based on the first and second performance metrics;
means for powering up the first receive chain if the first mode is selected;
means for powering up the first receive chain and the second receive chain if the second mode is selected; and
means for powering down the second receive chain if the first mode is selected.

23. The apparatus of claim 22, wherein the means for determining the first performance metric comprises means for determining the first performance metric based on performance of the equalizer in the first demodulation path, and wherein the means for determining the second performance metric comprises means for determining the second performance metric based on performance of the first rake receiver in the second demodulation path and the second rake receiver in the third demodulation path.

24. The apparatus of claim 23, further comprising:
means for periodically powering up the second receive chain to determine the second performance metric when the first mode is selected.

25. The apparatus of claim 22, wherein the means for determining the first performance metric comprises means for determining the first performance metric based on performance of the equalizer, and wherein the means for determining the second performance metric comprises means for determining the second performance metric based on performance of only the first rake receiver.

26. The apparatus of claim 22, wherein the means for selecting the first or second mode comprises
means for comparing the first performance metric against the second performance metric,
means for selecting the first mode if the first performance metric is better than the second performance metric, and
means for selecting the second mode if the second performance metric is better than the first performance metric.

27. The apparatus of claim 22, wherein the first receive chain is configured to process a first signal from a first antenna, and the second receive chain is configured to process a second signal from a second antenna, wherein the first antenna is associated with both the equalizer and the first rake receiver and the second antenna is associated with the second rake receiver.

28. The apparatus of claim 22, wherein the first and second performance metrics each comprise ratios.

29. The apparatus of claim 28, wherein the ratios comprise one of:
energy-per-chip-to-total-received-power ratios (Ec/Io), and
energy-per-bit-to-total-noise ratios (Eb/Nt).

30. A computer program product, comprising:
a non-transitory computer-readable medium comprising:
code for causing at least one computer to determine from a first demodulation path a first performance metric for a first mode of operation for a device, wherein, when the device operates in the first mode, the device uses the first demodulation path having an equalizer in a first receive chain to process a received transmission;
code for causing the at least one computer to determine from second and third demodulation paths a second performance metric for a second mode of operation for the device, wherein, when the device operates in the second mode, the device uses the second demodulation path having a first rake receiver in the first receive chain and the third demodulation path having a second rake receiver in a second receive chain to process the received transmission;
code for causing the at least one computer to select the first or second mode based on the first and second performance metrics; and
code for causing the at least one computer to power up the first receive chain if the first mode is selected, power up the first receive chain and the second receive chain if the second mode is selected, and power down the second receive chain if the first mode is selected.

31. The computer program product of claim 30, wherein the non-transitory computer-readable medium further comprises:
code for causing the at least one computer to determine the first performance metric based on performance of the equalizer in the first demodulation path; and
code for causing the at least one computer to determine the second performance metric based on performance of the first rake receiver in the second demodulation path and the second rake receiver in the third demodulation path.

32. The computer program product of claim 30, wherein the non-transitory computer-readable medium further comprises:
code for causing the at least one computer to determine the first performance metric based on performance of the equalizer; and
code for causing the at least one computer to determine the second performance metric based on performance of only the first rake receiver.

33. The computer program product of claim 30, wherein the first receive chain is configured to process a first signal from a first antenna, and the second receive chain is configured to process a second signal from a second antenna, wherein the first antenna is associated with both the equalizer and the first rake receiver and the second antenna is associated with the second rake receiver.

34. The computer program product of claim 30, wherein the first and second performance metrics each comprise ratios.

35. The computer program product of claim 34, wherein the ratios comprise one of:
  energy-per-chip-to-total-received-power ratios (Ec/Io), and
  energy-per-bit-to-total-noise ratios (Eb/Nt).

36. An apparatus configured to operate in a first mode and a second mode, the apparatus comprising:
  a first receive chain configured to process a first signal from a first antenna, the first receive chain comprising a first demodulation path having an equalizer and a second demodulation path having a first rake receiver, wherein the first antenna is associated with both the equalizer and the first rake receiver;
  a second receive chain configured to process a second signal from a second antenna, the second receive chain comprising a third demodulation path having a second rake receiver, wherein the second antenna is associated with the second rake receiver;
  at least one processor configured to determine a first performance metric for the first mode, to determine a second performance metric for the second mode, and to select the first or second mode based on the first and second performance metrics, wherein, when operating in the first mode, the apparatus uses the equalizer of the first demodulation path in the first receive chain to process a received transmission, and wherein, when operating in the second mode, the apparatus uses the first rake receiver of the second demodulation path in the first receive chain and the second rake receiver of the third demodulation path in the second receive chain to process the received transmission; and
  a memory coupled to the at least one processor, wherein the at least one processor is configured to power down the second receive chain if the first mode is selected.

* * * * *